US012384123B2

(12) United States Patent
McGuckin et al.

(10) Patent No.: US 12,384,123 B2
(45) Date of Patent: Aug. 12, 2025

(54) ELASTOMERIC INTENSIFIERS FOR PART MANUFACTURE AND METHODS OF MAKING ELASTOMERIC INTENSIFIERS

(71) Applicant: The Boeing Company, Arlington, VA (US)

(72) Inventors: Abigail McGuckin, Media, PA (US); Michael Joseph Mikuszewski, Wilmington, DE (US)

(73) Assignee: The Boeing Company, Arlington, VA (US)

( * ) Notice: Subject to any disclaimer, the term of this patent is extended or adjusted under 35 U.S.C. 154(b) by 191 days.

(21) Appl. No.: 18/298,541

(22) Filed: Apr. 11, 2023

(65) Prior Publication Data
US 2024/0343003 A1    Oct. 17, 2024

(51) Int. Cl.
| | |
|---|---|
| B29C 70/68 | (2006.01) |
| B29C 70/70 | (2006.01) |
| B29K 83/00 | (2006.01) |
| B29K 505/08 | (2006.01) |

(52) U.S. Cl.
CPC ............ *B29C 70/683* (2013.01); *B29C 70/70* (2013.01); *B29K 2083/00* (2013.01); *B29K 2505/08* (2013.01)

(58) Field of Classification Search
CPC ....... B29C 70/683; B29C 70/70; B29C 70/68; B29C 70/681; B29C 70/682; B29C 51/10; B29C 51/105; B29C 51/26; B29C 51/36; B29C 51/30; B29C 51/12; B29K 2083/00; B29K 2505/08
See application file for complete search history.

(56) References Cited

U.S. PATENT DOCUMENTS

2003/0104094 A1* 6/2003 Sloman ................. B30B 15/061
                                                        425/389
2023/0398751 A1* 12/2023 Tokutomi .............. B29C 70/443

FOREIGN PATENT DOCUMENTS

CN         102471506 A  *  5/2012  ............. B32B 27/08

OTHER PUBLICATIONS

Translation of CN102471506, Wakeman, May 2012.*

* cited by examiner

Primary Examiner — Philip C Tucker
Assistant Examiner — Jimmy R Smith, Jr.
(74) Attorney, Agent, or Firm — Hanley, Flight & Zimmerman, LLC (57) ABSTRACT

Elastomer intensifiers for part manufacture and methods of making elastomeric intensifiers are described herein. An example method of fabricating an intensifier includes: add a mixture to a region of a mold, the mixture including a first amount of an elastomer and a constituent; curing the mixture to form an insert having a shape corresponding to the region of the mold; adding a second amount of the elastomer to the mold and over the insert; and curing the insert and the second amount of the elastomer to form the intensifier.

13 Claims, 9 Drawing Sheets

ELASTOMERIC INTENSIFIERS FOR PART MANUFACTURE AND METHODS OF MAKING ELASTOMERIC INTENSIFIERS

GOVERNMENT INTEREST

This invention was made with Government support under (N00019-17-C-0015) awarded by (Department of Defense). The government has certain rights in this invention.

FIELD OF THE DISCLOSURE

This disclosure relates generally to manufacturing and, more particularly, to elastomeric intensifier for part manufacture and methods of making elastomeric intensifiers.

BACKGROUND

Many composite parts, such as those on aircraft, are manufactured using a mold assembly that includes a mold and an intensifier. This process involves adding part material in the mold and then placing the intensifier on top of the part material to apply pressure to the part material. The part material is then cured to harden or set the material, which forms the final shape.

SUMMARY

An example method of fabricating an intensifier disclosed herein includes add a mixture to a region of a mold. The mixture includes a first amount of an elastomer and a constituent. The method also includes curing the mixture to form an insert having a shape corresponding to the region of the mold, adding a second amount of the elastomer to the mold and over the insert, and curing the insert and the second amount of the elastomer to form the intensifier.

An example intensifier for use in fabricating a part disclosed herein includes a first flange, a second flange, and a web between the first and second flanges. A first portion of the intensifier is composed of a first amount of an elastomer and a second portion of the intensifier is composed of a mixture of a constituent and a second amount of the elastomer.

An example method of fabricating a part disclosed herein includes adding part material to a mold, placing a contact barrier over the part material in the mold, placing an intensifier in the mold over the contact barrier and the part material. The intensifier includes a first portion composed of a first amount of an elastomer and a second portion composed of a mixture of a constituent and a second amount of the elastomer. The second portion is stiffer than the first portion. The method also includes curing the part material to form the part.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Disclosed herein are example elastomeric intensifiers and example methods of manufacturing, fabricating, or forming elastomeric intensifiers that are used in the manufacture of parts, such as composite parts for an aircraft. An intensifier is a tool in a mold assembly that is used to apply pressure to part material to shape or form the part. In particular, after the part material is added to a mold, the intensifier is used to apply an even pressure or force on the part material to help shape the material into its final shape during curing. The example intensifiers disclosed herein have one or more regions or portions that are composed of denser material, referred to herein as localized densification. These regions with localized densification can be specifically selected based on the geometry or configuration of the intensifier. This localized densification results in a stronger, stiffer region that limits or reduces bending/deflection during the part manufacturing process. As such, the example intensifier can apply a more uniform or even pressure during the part manufacturing process. This results in a part having a more uniform thickness and results in better quality control during the manufacturing process.

An example intensifier disclosed herein has a first portion or region composed of an elastomer and a second portion or region, which is embedded and/or otherwise formed in the first portion, that is composed of a mixture of the elastomeric and a constituent. Said another way, the intensifier is composed of an elastomer and a constituent is added to a specific portion or region of the intensifier. The constituent, which may also be referred to as a stiffener, densifier, or additive, can be any material that helps densify, strengthen, and/or stiffen the region or portion to which it is added. The second portion can correspond to a region or area of the intensifier that typically provides poor or uneven pressure during a part manufacturing process. The location can be specifically selected based on the part geometry or configuration. For example, the second portion may be formed at a curved or corner region of the intensifier. The elastomer can be any high temperature elastomer. In some examples, the elastomer is silicone (e.g., a high durometer silicone) and the constituent is a metal powder, such as tungsten powder. The addition of the tungsten powder to the silicone results in a stronger, stiffer material that is less susceptible to bending. In other examples, the elastomer and/or the constituent can be other materials.

An example method of fabricating an example intensifier is also disclosed herein. The example method includes mixing a first amount of the elastomer and the constituent to form a mixture and adding the mixture to a region of a mold. The mixture is then cured (e.g., hardened) to form an insert, which corresponds to the second portion. In some examples, the insert is removed and one or more edges of the insert are beveled. The insert is then inserted back into the mold, and a second amount of the elastomer (which corresponds to the first portion) is added (e.g., poured) into the mold and over the insert. The elastomer is then cured. As a result, the insert is embedded and/or otherwise formed with the elastomer. The insert forms the second portion of the intensifier with the constituent. This portion is stronger and stiffer than the surrounding portion. This enables the intensifier to apply a more even or uniform pressure when being used during a part manufacturing process.

Figure 1:
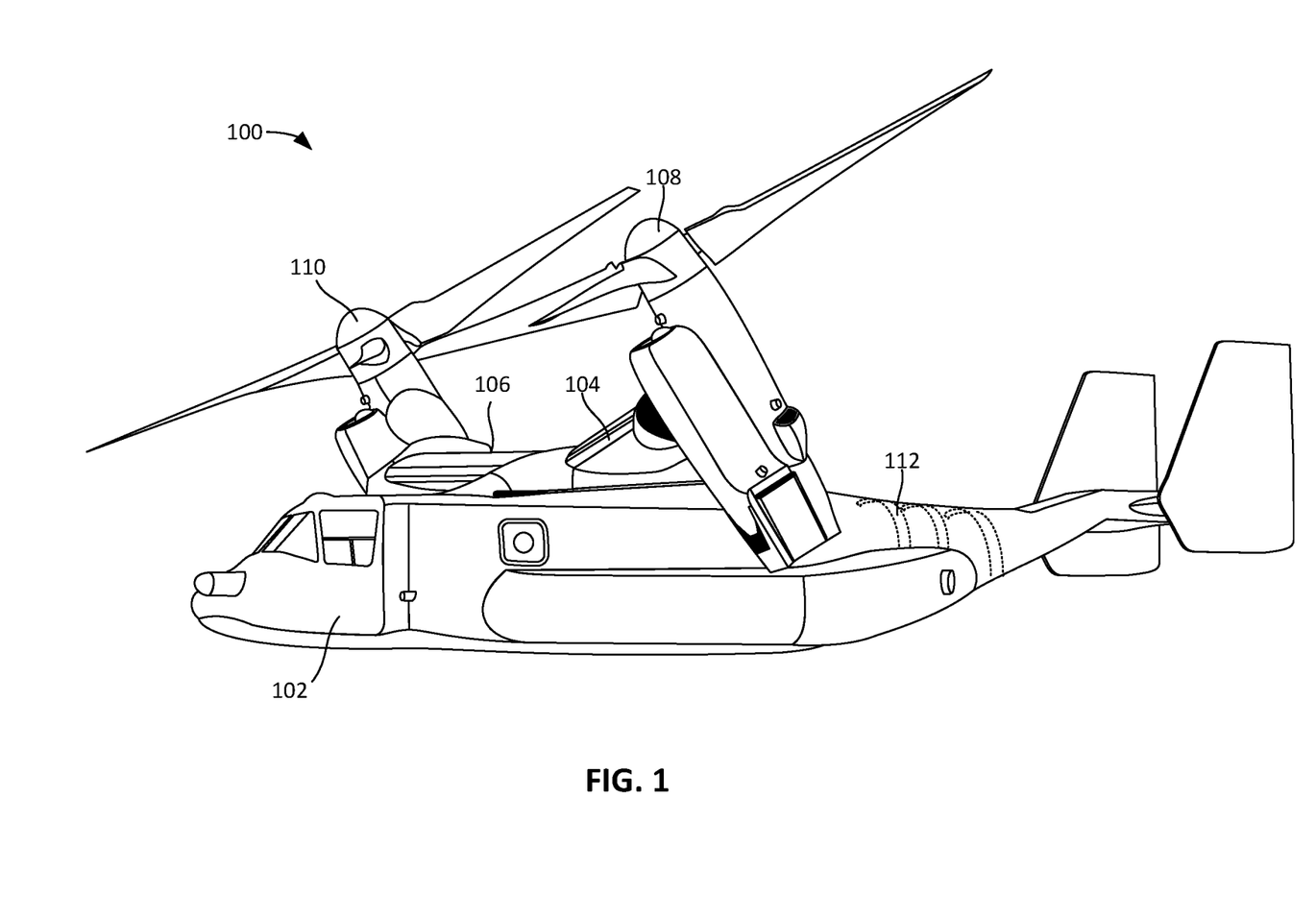
FIG. 1 illustrates an example aircraft having one or more parts manufactured using example intensifiers and example manufacturing processes disclosed herein.

FIG. 1 illustrates an example aircraft 100 with which the examples disclosed herein can be implemented. In this example, the aircraft 100 is implemented as a vertical takeoff and lift (VTOL) aircraft. However, the examples disclosed herein can also be implemented in connection with other types of aircraft.

In the illustrated example, the aircraft 100 includes a fuselage 102 that defines a cabin where the passengers and/or cargo are carried. The aircraft 100 includes a first wing 104 and a second wing 106 extending from opposite sides of the fuselage 102. The aircraft 100 includes a first engine 108 (e.g., a turboprop engine) carried at the end of the first wing 104 and a second engine 110 carried the end of the second wing 106. The first and second engines 108, 110 can be rotated or angled relative to the fuselage 102 to change the direction of thrust produced by the first and second engines 108, 110. For example, during takeoff, the first and second engines 108, 110 can be oriented in the vertical direction to produce vertical thrust for lifting the aircraft 100 from the ground. Then, the first and second engines 108, 110 can be rotated to a more horizontal direction to produce forward thrust to propel the aircraft 100 through the air.

The fuselage 102 of the aircraft 100 includes a plurality of frame members that form the frame structure of the fuselage 102. An example frame member 112 is shown in dotted lines. The frame member 112 is a curved beam that forms the aft section of the fuselage 102. The fuselage 102 may include multiple ones of the frame member 112. Disclosed herein are example mold assemblies and associated methods for manufacturing/fabricating the frame member 112. However, the examples disclosed herein can also be used in the manufacture of other parts of the aircraft 100. Further, the examples disclosed herein can be used in the manufacture of non-aircraft parts.

Figure 2:
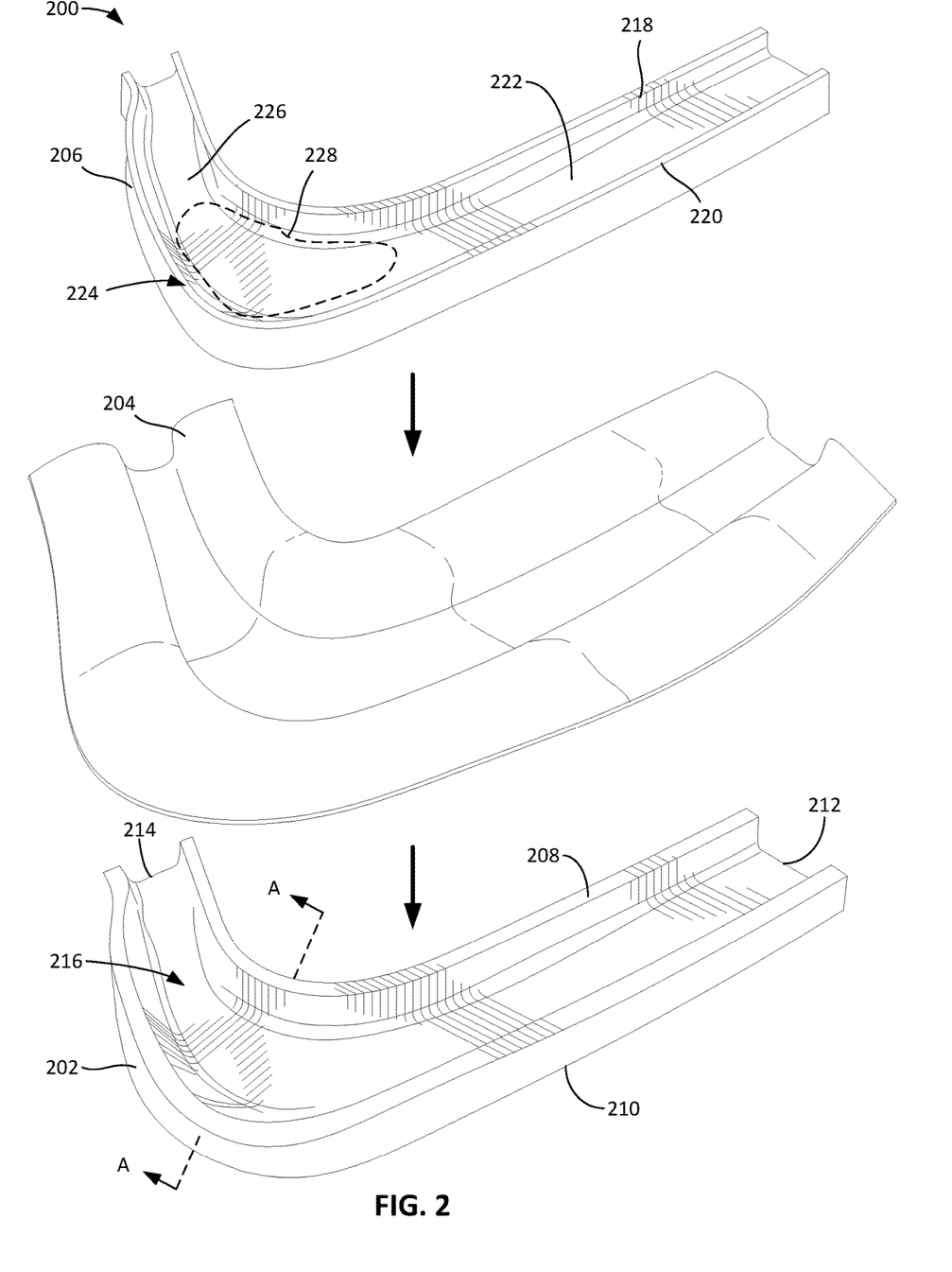
FIG. 2 illustrates an example mold assembly including an example intensifier that can be used to manufacture an example part of the example aircraft of FIG. 1.

FIG. 2 illustrates an example mold assembly 200 that can be used in the manufacture, fabrication, or forming of a part, such as the frame member 112 of FIG. 1. The mold assembly 200 can also be referred to as a mold system, kit, or tool. The mold assembly 200 can be used to fabricate any type of part, such as composite part or a metal bond part, for example. The mold assembly 200 includes one or more parts or tools used for molding the frame member 112. The resulting part can be a constructed of a single material or multiple materials (e.g., a composite part).

In the illustrated example of FIG. 2, the mold assembly 200 includes a mold 202, a contact barrier 204, and an intensifier 206. The mold 202, sometimes referred to as a bonding assembly jig (BAJ), can be constructed of metal (e.g., stainless steel) or another rigid material. The mold 202 has a top side 208, a bottom side 210, a first end 212, and a second end 214. The mold 202 has a cavity 216 formed in the top side 208. In this example, the cavity 216 extends between the first end 212 and the second end 214. The cavity 216 has a shape or contour that corresponds to the desired outer shape of the frame member 112. In this example, the cavity 216 has a C- or U-shaped cavity, which is used to form a C- or U-shaped frame member.

To construct the frame member 112, part material (not shown) is added into the cavity 216 of the mold 202. The part material may be in a liquid form (e.g., resin) or solid form (e.g., fabric, powder, etc.). In some examples, the frame member 112 is constructed of a composite graphite material. Therefore, a composite graphite material can disposed in the cavity 216 of the mold 202. In some examples, the composite graphite material includes a graphite fabric constructed of multiple layers or plies. The graphite fabric may be pre-formed on a mandrel, and then transferred to the mold 202. In other examples, the frame member 112 can be constructed of other types of materials.

The contact barrier 204, which may also be referred to as a parting film, is a thin film (e.g., a plastic film) used to form a non-stick barrier between the part material and the intensifier 206. The contact barrier 204 can be constructed of PFV, Fluorinated Ethylene Propylene (FEP), and/or polytetrafluoroethylene. In other examples, the contact barrier 204 can be constructed of other materials.

Once the part material is in the cavity 216 and the contact barrier 204 is placed over the top of the part material, the intensifier 206 is placed into the cavity 216 on top of the contact barrier 204 and the part material. The intensifier 206 has a shape or contour corresponding to an inner side of the frame member 112. Therefore, the intensifier 206 may be considered a second mold or mold part. The intensifier 206 is at least partially constructed or composed of an elastomer, disclosed in further detail herein. When the intensifier 206 is placed on top of the contact barrier 204, the part material is compressed between the mold 202 and the intensifier 206, which thereby forms the final desired shape of the frame member 112. In some examples, pressure from a machine or vacuum bag is applied to the intensifier 206, which helps press the intensifier 206 into the mold 202. In some examples, the part material is then cured for a period of time between the mold 202 and the intensifier 206. In some examples, the part material is press cured or cured in an oven or autoclave. During curing, the part material hardens or sets, and thereby forms the frame member 112. In some examples, the frame member 112 is removed from the mold assembly 200 and then further processed (e.g., trimmed, painted, etc.) to form the final part. This process can be used to manufacture parts for a wide variety of industries and applications.

As can be appreciated from FIG. 2, the intensifier 206 has a complex geometry that corresponds to the complex geometry the frame member 112. The intensifier 206 has a first flange 218, a second flange 220, and a web 222 between the first and second flanges 218, 220. As such, the intensifier 206 has a C-shaped or U-shaped cross-section. Further, the intensifier 206 is curved between its two ends, thereby forming an L-shape along its length. This forms a corner or curved region 224 that has curves in two planes (e.g., a horizontal plane and a vertical plane). When the intensifier 206 is placed on the part material, it is desired for the first and second flanges 218, 220 and the web 222 to apply a uniform or even pressure. If the intensifier 206 does not lay flat or level on the part material, this can result in defects in the frame member 112 along the curved region 224.

Figure 3:
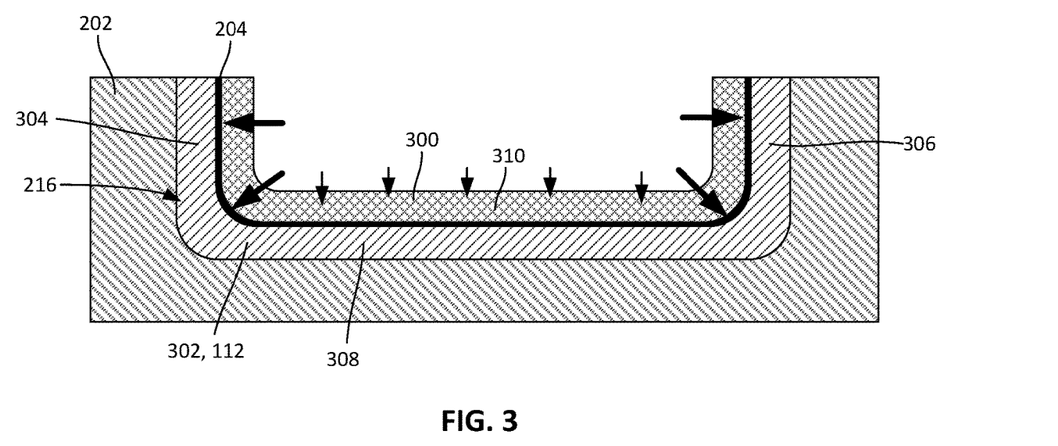
FIG. 3 shows a layup of a mold assembly including a known intensifier during a part manufacturing process.

For example, FIG. 3 is a cross-sectional view of a layup using the mold 202 and a known intensifier 300. The cross-sectional view corresponds to the same region as the curved region 224 of FIG. 2. As shown in FIG. 3, part material 302 (e.g., composite graphite material) is disposed in the cavity 216 of the mold 202. The known intensifier 300 is placed on top of the part material 302. The contact barrier 204 is disposed between the part material 302 and the known intensifier 300.

Figure 4:
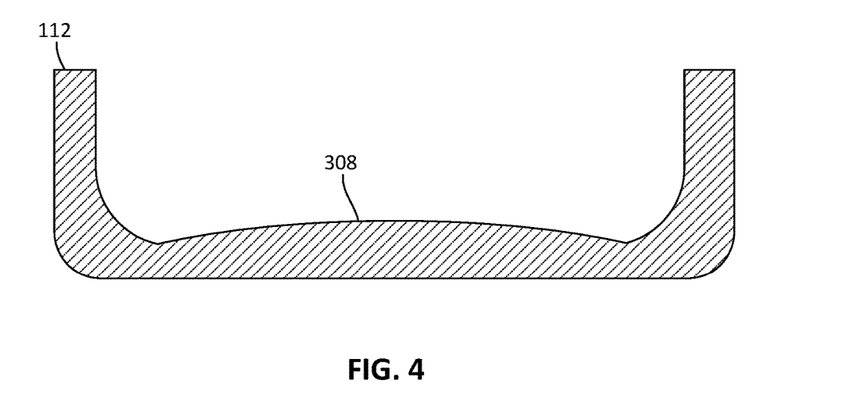
FIG. 4 shows a resulting part manufactured with the known intensifier of FIG. 3.

As shown in FIG. 3, the frame member 112 has a first flange 304, a second flange 306, and a web 308 between the first and second flanges 304, 306. It is intended for the frame member 112 to have a substantially constant thickness throughout the flanges 304, 306 and the web 308. The known intensifier 300 is composed or constructed of liquid silicone molding rubber from Shen-Etzu Chemical Co., Ltd., which is relatively compliant or flexible. In some instances, during this fabrication process, a web 310 of the known intensifier 300 does not provide uniform or even pressure on the web 308 of the frame member 112. As shown by the arrows in FIG. 3, most of pressure is applied to the corners or radii, while little or no pressure is applied by the web 310 of the known intensifier 300 to the web 308 of the frame member 112. This results in undesired dimensional deviations to the web 308 of the frame member 112. For example, FIG. 4 shows an example of the frame member 112 after being removed from the mold 202 and the known intensifier 300. As shown, the web 308 is bowed upward, which is the result of the uneven pressure from the web 310 of the intensifier 300. Therefore, the frame member 112 in FIG. 4 has varying density and thickness. This change in thickness negatively affects the installation of the frame member 112, which may require clips to be attached to the web 308.

The example intensifier 206 of FIG. 2 has a different composition or material that enables the intensifier 206 to apply a more even or uniform pressure to reduce or eliminate the undesired dimensional deviations noted above. In this example, the intensifier 206 is composed or constructed of an elastomer with a local densifier added to the elastomer material at the curved region 224 of the intensifier 206. The addition of the local densifier helps strengthen or provide more rigidity to the curved region 224 of the intensifier 206. Referring to FIG. 2, the intensifier 206 has a first portion 226 (e.g., a region or area) that makes up a majority of the intensifier 206. The first portion 226 is composed of the elastomer. The intensifier 206 also has a second portion 228 (e.g., a region or area) that is embedded in and/or otherwise formed with the first portion 226. The second portion 228 is composed of a mixture of the elastomer and a constituent. Said another way, a constituent has been added to the elastomer material in the second portion 228. The second portion 228 corresponds to a portion of the web 222 along the curved region 224. The second portion 228 having the constituent is stiffer than the first portion 226. Therefore, the portion of the web 222 along the curved region 224 is stiffer and applies a more uniform or even pressure during the part fabrication process. The elastomer can be a high temperature elastomer. The durometer, toughness, and flexibility can be selected based on the specific application. In some examples, the elastomer is a high durometer silicone, such as SILASTIC™ J silicone from Dow®, and the constituent is a metal powder, such as tungsten powder. This results in a relatively stiff composition. The high durometer silicone is denser than the type of silicone used in known intensifiers, and with the addition of the tungsten powder, this creates a denser and stiffer region to ensure uniform pressure is applied. In other examples, the first and second portions 226, 228 can be composed of other types of elastomers (e.g., silicones and/or rubbers) and/or constituents. For example, the elastomer can include at least one of high durometer silicone (e.g., SILASTIC™ J silicone), flexible silicone rubber (e.g., RTV-4130-J), high strength tear resistant silicone rubber (e.g., SILASTITC™ E silicone from Dow®, RTV-4130-E), liquid silicone molding rubber (e.g., from Shin-Etsu Chemical Co., Ltd.), or silicone that cures at room temperature (e.g., RTV silicones). Further, the constituent can include at least one of aluminum powder, steel powder/shot, tungsten powder, phenolic microspheres, or glass microspheres.

Figure 5:
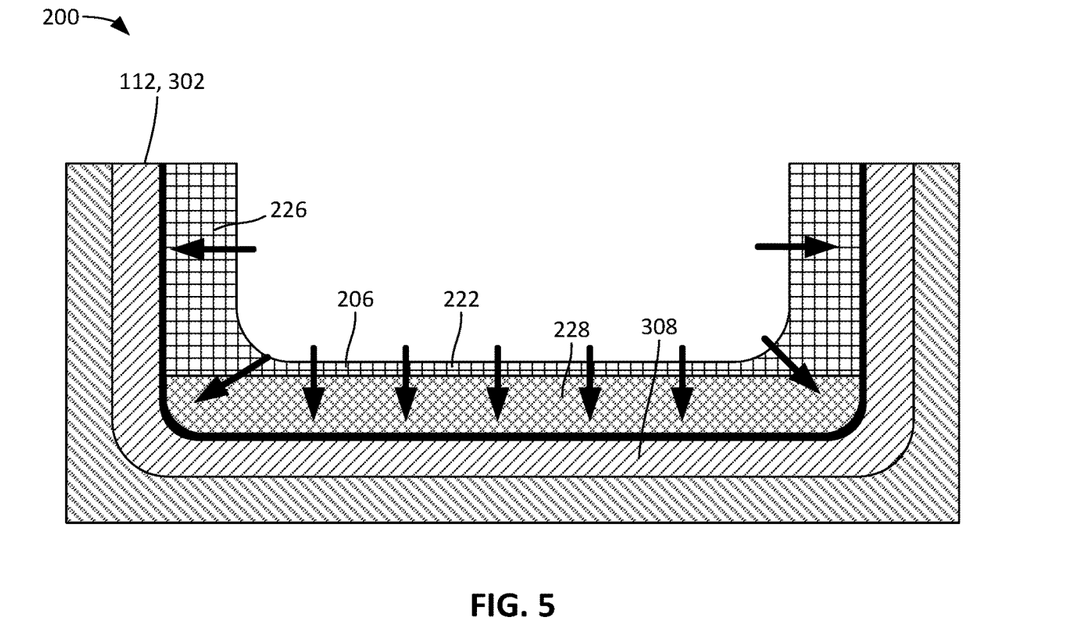
FIG. 5 shows an example layup of the example mold assembly of FIG. 2 including the example intensifier during a part manufacturing process.

FIG. 5 is a cross-sectional view of an example layup of the mold assembly 200 taken a long line A-A in FIG. 2 (through the curved region 224) during fabrication of the frame member 112. As disclosed above, the first portion 226 of the intensifier 206 is composed of the elastomer (e.g., a high durometer silicone) (without a constituent) and the second portion 228 of the intensifier 206 is composed of a mixture of the elastomer (e.g., a high durometer silicone) and the constituent (e.g., tungsten powder). As shown in FIG. 5, the second portion 228 is along the bottom and corners (radii) of the web 222 of the intensifier 206, which is the portion of the intensifier 206 that forms the web 308 of the frame member 112. As such, as shown by the arrows, this region is stiffer and provides a more uniform or equal pressure to the part material 302 that forms the web 308 of the frame member 112.

Figure 6:
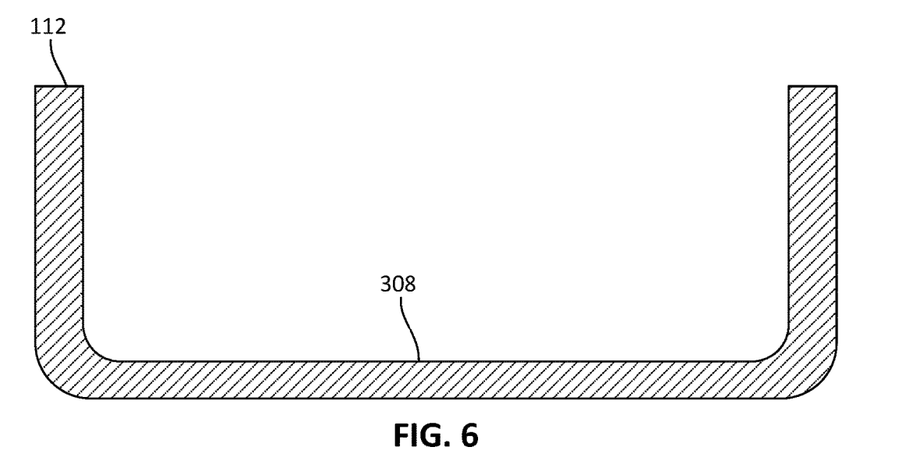
FIG. 6 shows a resulting part manufactured with the example intensifier of FIG. 5.

FIG. 6 shows an example of the frame member 112 after being removed from the mold 202 and the intensifier 206. As shown, the web 308 has a substantially even or uniform thickness. Thus, use of the example intensifier 206 with the local densification prevents or reduces the undesired dimensional deviations noted above in connection with known intensifiers as shown in FIGS. 3 and 4. While in this example, the intensifier 206 has only one portion or region with the constituent, in other examples, the intensifier 206 can be formed to have more than one portion or region with the constituent.

Figure 7A:
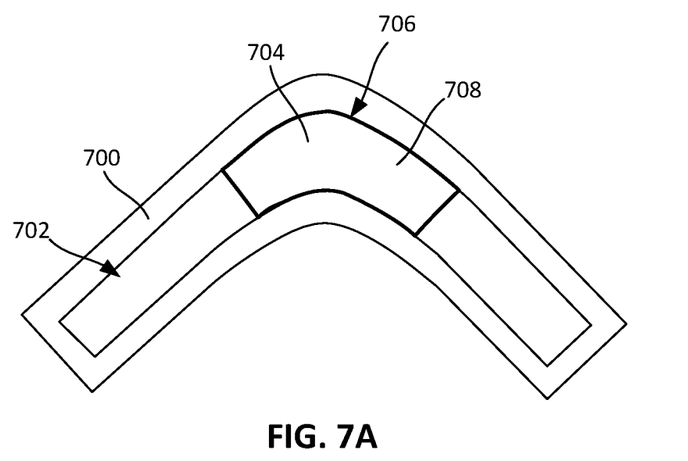
FIGS. 7A-7H illustrate an example sequence of steps for manufacturing or fabricating the example intensifier of FIG. 2.

FIGS. 7A-7H show an example sequence of steps used to manufacture, fabricate, form, or construct the example intensifier 206. FIG. 7A is a top view of a first mold 700 having a cavity 702 with the desired shape of the intensifier 206. A first amount of the elastomer (e.g., high durometer silicone) and the constituent (e.g., tungsten powder) are mixed together to create a mixture 704. As shown in FIG. 7A, the mixture 704 is the added into the cavity 702 of the first mold 700 at a curved or corner region 706 of the first mold 700. In some examples, the first amount of the elastomer and the constituent are mixed in a separate location in and then added to the first mold 700. In other examples, the first amount of the elastomer and the constituent can be added and mixed together in the first mold 700. In some examples, the thickness of the mixture 704 is only about half the total thickness of the web 222 of the intensifier 206. The mixture 704 is allowed to cure in the first mold 700. In some examples, the mixture 704 cures under ambient temperatures. Alternatively, the mixture 704 can be cured in an oven or autoclave.

Figure 7B:
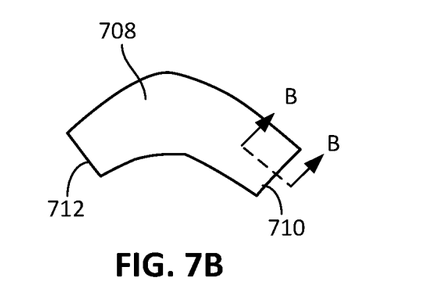
Figure 7C:
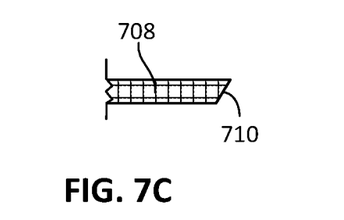

The mixture 704 hardens and forms an insert 708. The insert 708 corresponds to the second portion 228 (FIGS. 2 and 5) of the intensifier 206 having the constituent. In some examples, it is desired to bevel or chamfer the edges of the insert 708 before adding the rest of the elastomer. For example, FIG. 7B shows the insert 708 after being removed from the first mold 700. The insert 708 retains the shape of the corner region 706 of the first mold 700. The insert 708 has a first edge 710 and a second edge 712. The first and second edge 710, 712 can be beveled or chamfered using a tool (e.g., a drill, a plane, a CNC machine, etc.). For example, FIG. 7C is a cross-sectional view taken along line B-B showing the first edge 710 as beveled. This enables the forthcoming elastomer to be disposed below a portion of the insert 708 and prevent the insert 708 from separating from the elastomer.

Figure 7D:
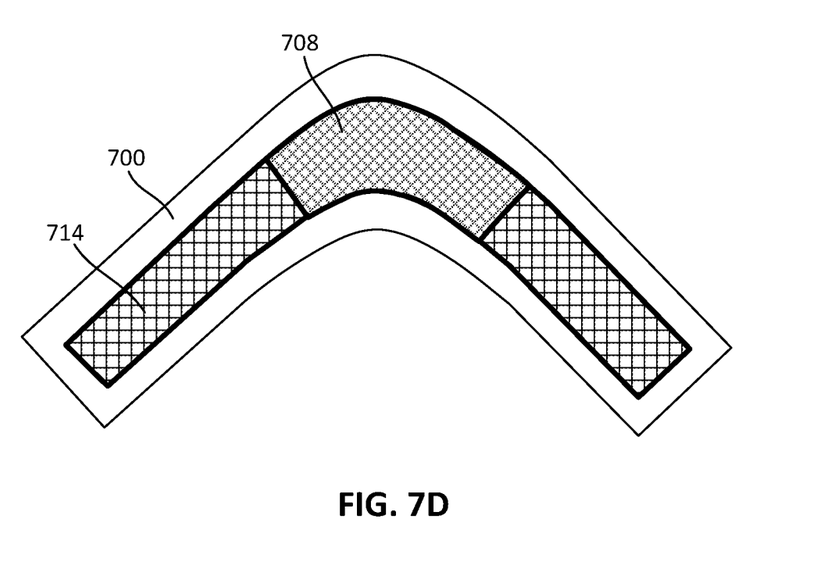
Figure 7E:
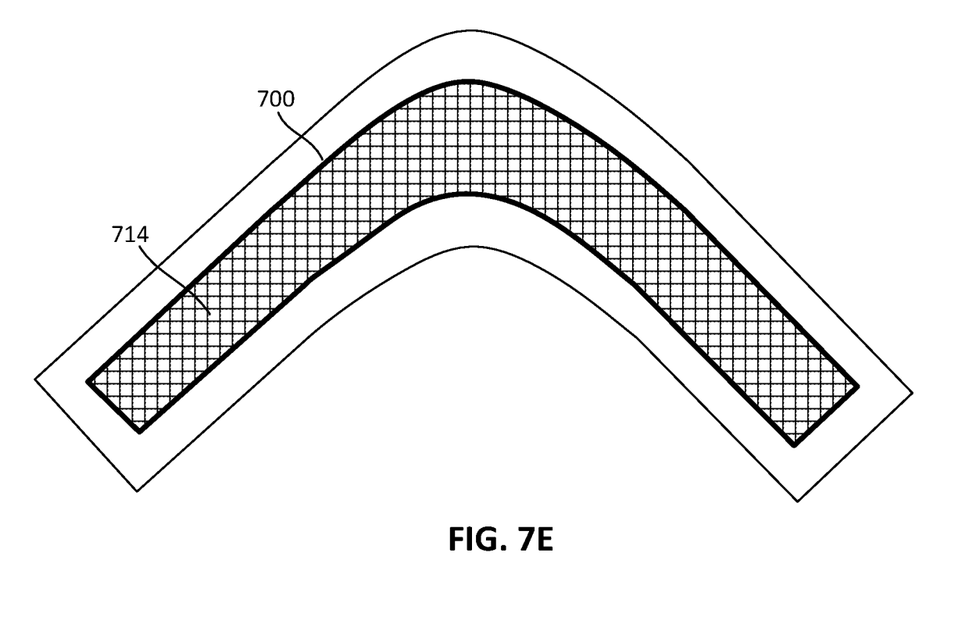

Referring to FIG. 7D, the insert 708 is disposed back in the first mold 700. Then, a second amount of the elastomer 714 is added (e.g., poured) into the first mold 700 on both sides of the insert 708 (as shown in FIG. 7D) and over the insert 708 (as shown in FIG. 7E), thereby at least partially encapsulating the insert 708 in the elastomer 714. This additional elastomer 714 forms the first portion 226 of the intensifier 206, which does not contain a constituent.

Figure 7F:
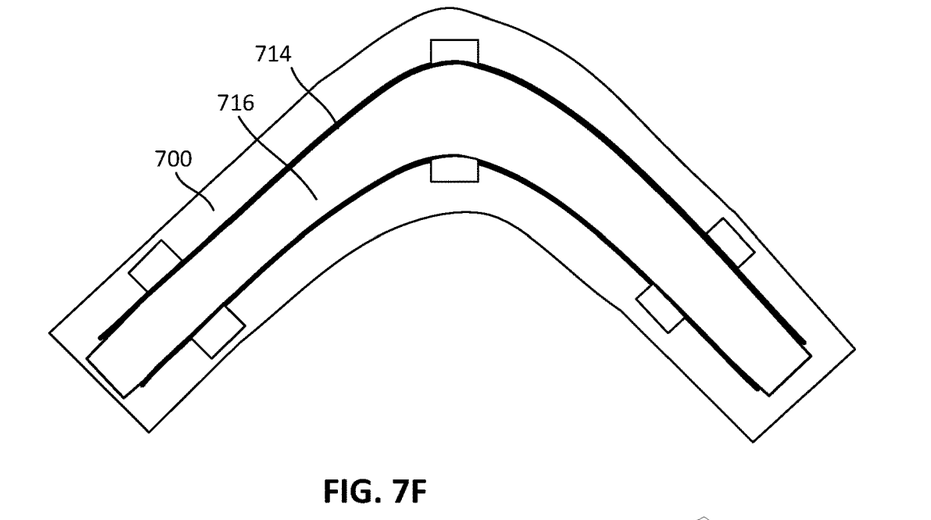

Then, as shown in FIG. 7F, a second mold 716 is placed in the first mold 700 on top of the elastomer 714. This shapes the elastomer 714 into the desired final shape of the intensifier 206. The elastomer 714 is allowed to cure (e.g., harden or set) and form the intensifier 206. In some examples, the elastomer 714 cures under ambient temperatures. Alternatively, the elastomer 714 can be cured in an oven or autoclave. After curing, the intensifier 206 is removed from the molds 700, 716. In some examples, one or more other types of operations (e.g., painting, drilling, etc.) may be performed during the manufacturing process to complete the final part.

Figure 7G:
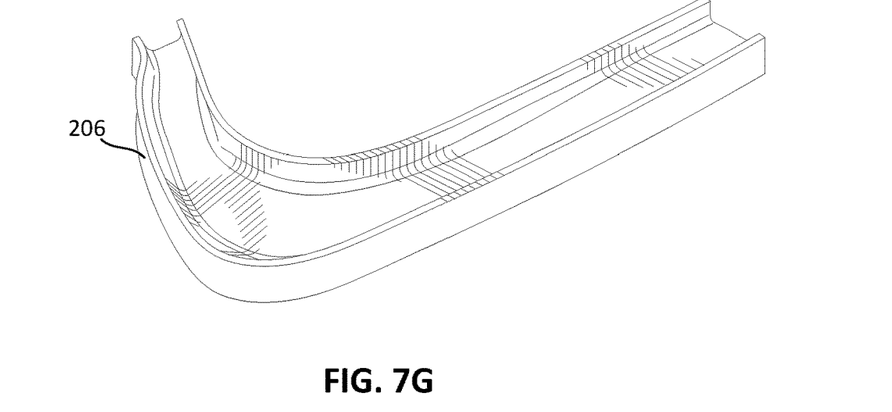
Figure 7H:
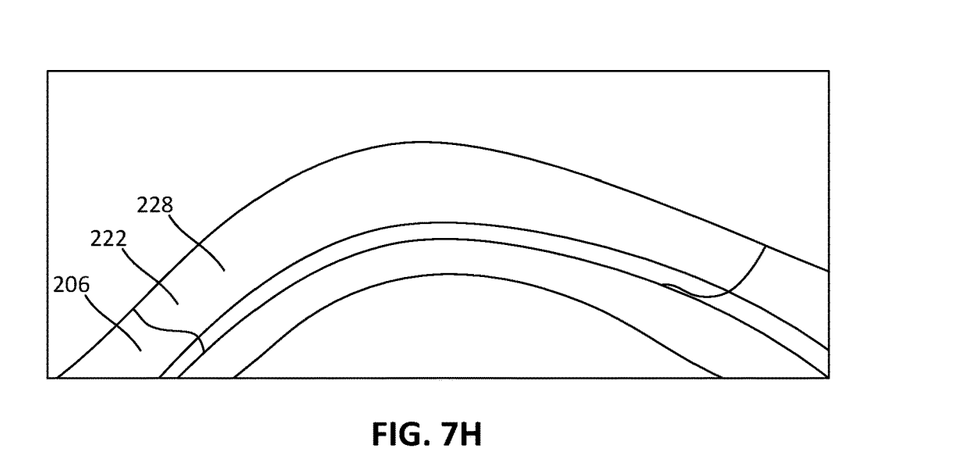

FIG. 7G shows a top perspective view of the intensifier 206 after being removed from the first and second molds 700, 716. FIG. 7H shows a bottom perspective view of the intensifier 206. The second portion 228 having the constituent forms a portion of a bottom side of the web 222 of the intensifier 206. As disclosed above, this second portion 228 has been strengthened or densified.

Figure 8:
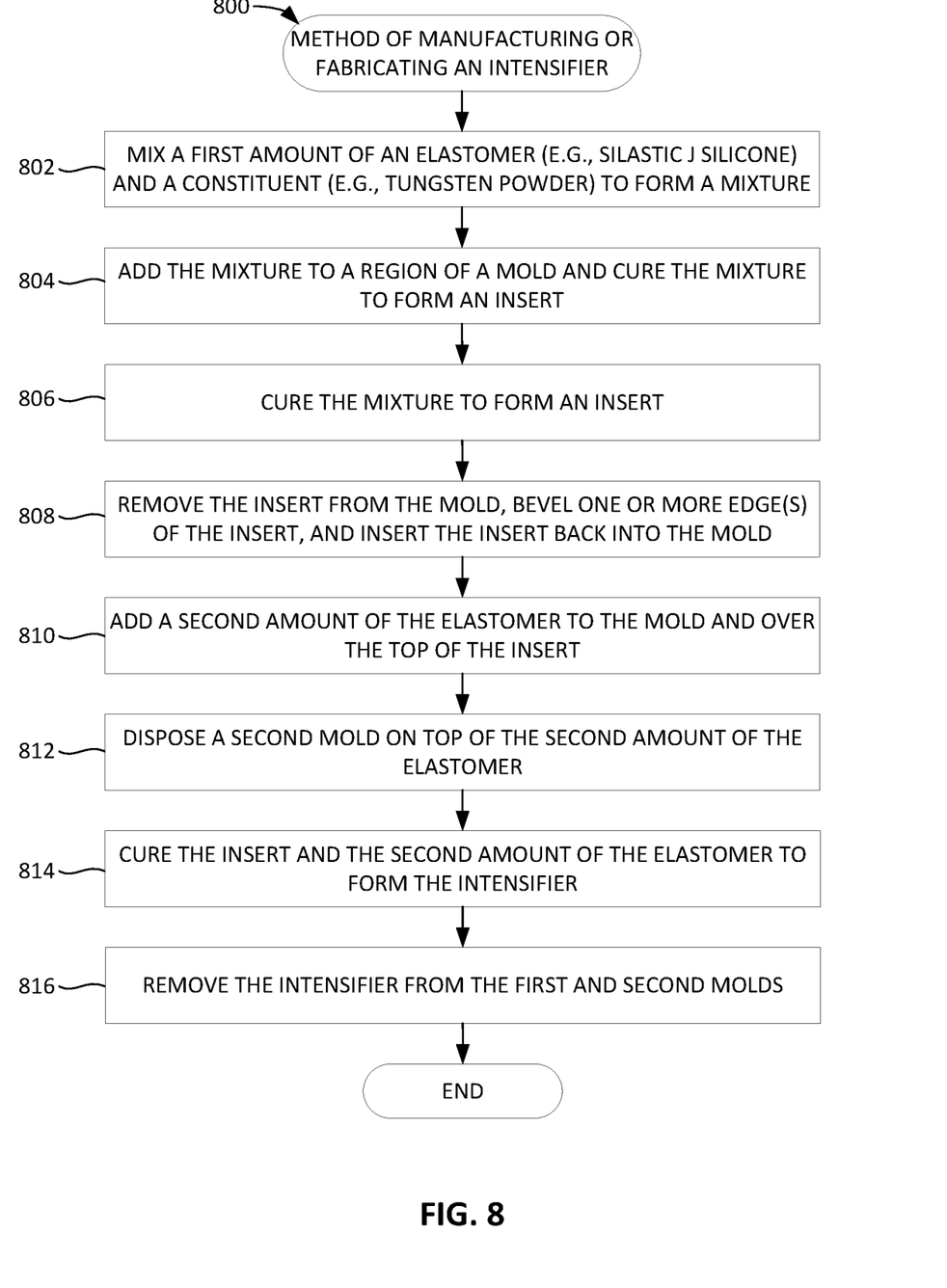
FIG. 8 is a flowchart representative of an example method of manufacturing or fabricating the example intensifier of FIG. 2.

FIG. 8 is a flowchart representative of an example method 800 of manufacturing or fabricating an intensifier. The example method 800 is described in connection with the intensifier 206 and the manufacturing sequence shown in FIGS. 7A-7H. However, other example intensifiers having other shapes or materials can similarly be fabricated using the example method 800. Any of the example operations represented by the blocks of the method 800 may be repeated, removed, and/or rearranged.

At block 802, the method 800 includes mixing a first amount of the elastomer and a constituent to form a mixture, such as the mixture 704. In some examples, the elastomer is a high durometer silicone, such as SILASTIC™ J silicone, and the constituent is tungsten powder. In other examples, the elastomer and/or the constituent can include other materials. For example, the elastomer can include at least one of high durometer silicone (e.g., SILASTIC™ J silicone), flexible silicone rubber (e.g., RTV-4130-J), high strength tear resistant silicone rubber (e.g., SILASTITC™ E silicone from Dow®, RTV-4130-E), liquid silicone molding rubber (e.g., Shin-Etsu Chemical Co., Ltd.), or silicone that cures at room temperature (e.g., RTV silicones). Further, the constituent can include at least one of aluminum powder, steel powder/shot, tungsten powder, phenolic microsphere, or glass microspheres.

At block 804, the method 800 includes adding the mixture 704 to a region (e.g., the corner region 706) of the first mold 700. The mixture 704 can be added to any region where localized densification and/or strengthening is desired. For example, the mixture 704 may be added to the corner region 706 of the first mold 700 as shown in FIG. 7A. In some examples the mixture 704 is created separately and then added to the first mold 700. In other examples, the mixture 704 can be created in the first mold 700. In such examples, one or more damming structures or barriers can be used to hold the mixture 704 in a specific location while curing.

At block 806, the method 800 includes curing the mixture 704. In some examples, the mixture 704 cures under ambient temperatures. Alternatively, the mixture 704 can be cured in an oven or autoclave. The mixture 704 cures or hardens to form the insert 708. The insert 708 has a shape corresponding to the corner region 706 of the first mold 700. The insert 708 forms the second portion 228 of the intensifier 206.

In some examples, it may be desirable to bevel one or more edges of the insert 708. Therefore, at block 808, the method 800 includes removing the insert 708 from the first mold 700 (as shown in FIG. 7B), beveling one or more of the edges 710, 712 of the insert 708 (as shown in FIG. 7C), and inserting the insert 708 back into the first mold 700 (as shown in FIG. 7D).

At block 810, the method includes adding a second amount of the elastomer 714 to the first mold 700 and over the top of the insert 708, as shown in FIGS. 7D and 7E. The second amount of the elastomer 714 forms the first portion 226 of the intensifier 206. At block 812, the method 800 includes disposing the second mold 716 on top of the second amount of the elastomer 714.

At block 814, the method 800 includes curing the insert 708 and the second amount of the elastomer 714 to form the intensifier 206. In some examples, the insert 708 and the second amount of the elastomer 714 are cured under ambient temperatures. Alternatively, the insert 708 and the second amount of the elastomer 714 can be cured in an oven or autoclave. After curing, at block 816, the method 800 includes removing the intensifier 206 from the first and second molds 700, 716. The intensifier 206 can then be used for manufacturing or fabricating a part, such as a frame member of an aircraft, an example of which is disclosed in connection with FIG. 9. The web 308 of the intensifier 206 has the first portion 226 and the second portion 228. The second portion 228 is located in the curved region 224 of the web 222 of the intensifier 206. The second portion 228 is stiffer than the first portion 226. This helps to apply even or uniform pressure during the part fabrication process.

Figure 9:
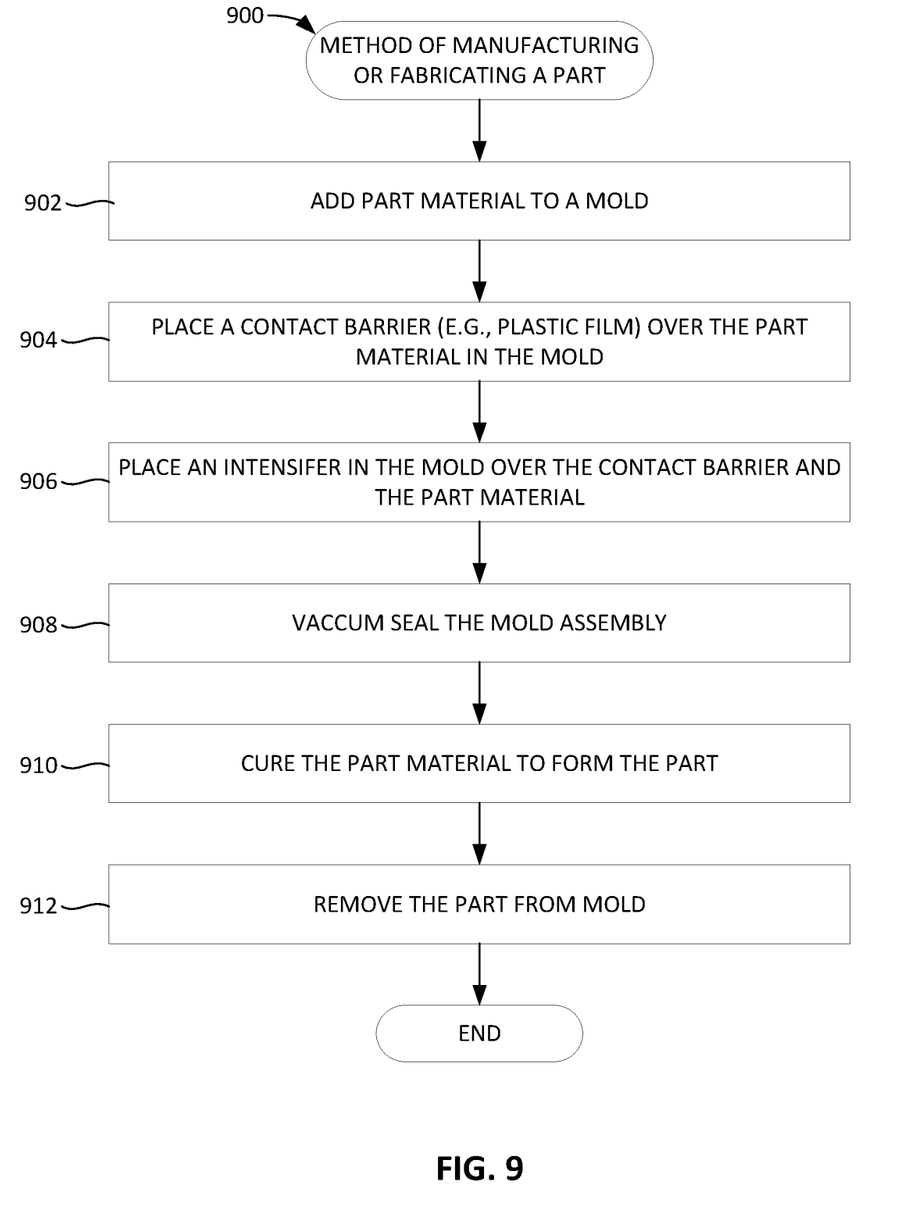
FIG. 9 is a flowchart representative of an example method of manufacturing or fabricating a part using the example intensifier of FIG. 2.

FIG. 9 is a flowchart representative of an example method 900 of manufacturing or fabricating a part using the example intensifier 206. The example method 900 is described in connection with manufacturing or fabricating the frame member 112. However, the method 900 may be similarly implemented to manufacture or fabricate other types of parts. Any of the example operations represented by the blocks of the method 900 may be repeated, removed, and/or rearranged.

At block 902, the method 900 includes adding part material to the mold 202. The part material can be added by hand or via a machine. The part material may be a powder material, a liquid material, or any other type of material. In some examples, the part material is graphite or a graphite composite. In other examples, the part material can include other materials.

In some examples, a contact barrier is used to help prevent the part material from sticking to the intensifier 206. Therefore, at block 904, the method 900 includes placing the contact barrier 204 (e.g., a plastic film) over the part material in the mold 202. However, in other examples, a contact barrier may not be used.

At block 906, the method 900 includes placing the intensifier 206 in the mold 202 over the contact barrier 204 and the part material. In some examples, pressure is then applied to the intensifier 206 to form the part. In some examples, external pressure from an autoclave or bladder is applied to the intensifier 206. In other examples, a technician (e.g., a person) can manually press on the intensifier 206. In other examples, pressure from another source can be applied. The example intensifier 206 disclosed herein include localized densification, which ensures a uniform and even pressure along the part material. This prevents or reduces defects like those shown in FIG. 4.

In some examples, before curing, the mold assembly 200 with the part material is vacuum sealed. Therefore, at block 908, the method 900 includes vacuum sealing the mold assembly 200. This vacuum sealing may provide additional pressure on the intensifier 206.

At block 910, the method 900 includes curing the part material to form the part (e.g., the frame member 112). In some examples, the mold assembly 200 with the part material is press cured. In other examples, the mold assembly 200 with the part material is cured in an oven or an autoclave. The oven or autoclave may heat the part material to a desired temperature (one time or multiple times) for curing. The hardened material maintains the shape of the mold 202 and the intensifier 206 and thereby forms the part (e.g., the frame member 112).

After curing, the vacuum seal is removed and the part (e.g., the frame member 112) is removed from the mold assembly 200 (block 912). In some examples, the part (e.g., the frame member 112) removed from the mold assembly 200 may be the final product. In other examples, one or more other operations may be performed on the part, such as painting, trimming, etc. If desired, the part (e.g., the frame member 112) can be trimmed or machined to form the final shape. For example, one or more edges or surfaces of the frame member 112 can be trimmed using a CNC machine.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example apparatus, systems, methods, and articles of manufacture have been disclosed that improve part manufacturing that involves the use of an intensifier. The example intensifiers disclosed herein have one or more areas of localized densification, which limits or reduces bending of the intensifier during the manufacturing process. This ensures the intensifier applies a more uniform or even pressure during the part manufacturing process. This improves quality control and reduces the amount of post-manufacturing processes (e.g., trimming) that are needed to form the part. This also ensure the final part has the desired thickness, which is specifically designed for installation on a machine (e.g., an aircraft). The example intensifiers disclosed herein can be used in for manufacturing any types of parts, such as composite parts or metal bond parts.

Examples and combinations of examples disclosed herein including the following:

Example 1 is a method of fabricating an intensifier. The method comprises adding a mixture to a region of a mold, the mixture including a first amount of an elastomer and a constituent, curing the mixture to form an insert having a shape corresponding to the region of the mold, adding a second amount of the elastomer to the mold and over the insert, and curing the insert and the second amount of the elastomer to form the intensifier.

Example 2 includes the method of Example 1, wherein the second amount of the elastomer forms a first portion of the intensifier and the insert forms a second portion of the intensifier, wherein the second portion is stiffer than the first portion.

Example 3 includes the method of Example 2, wherein the second portion is located in a curved region of the intensifier.

Example 4 includes the method of any of Examples 1-3, wherein the elastomer is silicone and the constituent is tungsten powder.

Example 5 includes the method of any of Examples 1-4, wherein the elastomer includes at least one of high durometer silicone, flexible silicone rubber, high strength tear resistant silicone rubber, liquid silicone molding rubber, or silicone that cures at room temperature.

Example 6 includes the method of any of Examples 1-5, wherein the constituent includes at least one of aluminum powder, steel powder/shot, tungsten powder, phenolic microspheres, or glass microspheres.

Example 7 includes the method of any of Examples 1-6, further including, prior to adding the second amount of the elastomer to the mold: removing the insert from the mold, beveling an edge of the insert, and inserting the insert back into the mold.

Example 8 includes the method of any of Examples 1-7, wherein the intensifier has a first flange, a second flange, and a web between the first and second flanges, and wherein the insert forms a portion of a bottom side of the web.

Example 9 includes the method of any of Examples 1-8, wherein the mold is a first mold, the method further including, after adding the second amount of the elastomer to the first mold, disposing a second mold on top of the first amount of the elastomer.

Example 10 includes the method of any of Examples 1-9, further including, after removing the intensifier from the mold, using the intensifier for fabricating a frame member for an aircraft.

Example 11 is an intensifier for use in fabricating a part. The intensifier comprises a first flange, a second flange, and a web between the first and second flanges. A first portion of the intensifier is composed of a first amount of an elastomer and a second portion of the intensifier is composed of a mixture of a constituent and a second amount of the elastomer.

Example 12 includes the intensifier of Example 11, wherein the second portion is stiffer than the first portion.

Example 13 includes the intensifier of Examples 11 or 12, wherein the elastomer is silicone and the constituent is tungsten powder.

Example 14 includes the intensifier of any of Examples 11-13, wherein the elastomer includes at least one of high durometer silicone, flexible silicone rubber, high strength tear resistant silicone rubber, liquid silicone molding rubber, or silicone that cures at room temperature.

Example 15 includes the intensifier of any of Examples 11-14, wherein the constituent includes at least one of aluminum powder, steel powder/shot, tungsten powder, phenolic microspheres, or glass microspheres.

Example 16 includes the intensifier of any of Examples 11-15, wherein the second portion forms a portion of a bottom side of the web.

Example 17 includes the intensifier of any of Examples 11-16, wherein the intensifier has a C-shaped cross-section.

Example 18 is a method of fabricating a part. The method comprises adding part material to a mold, placing a contact barrier over the part material in the mold, and placing an intensifier in the mold over the contact barrier and the part material. The intensifier includes a first portion composed of a first amount of an elastomer and a second portion composed of a mixture of a constituent and a second amount of the elastomer, the second portion being stiffer than the first portion. The method also includes curing the part material to form the part.

Example 19 includes the method of Example 18, wherein the elastomer is silicone and the constituent is tungsten powder.

Example 20 includes the method of Examples 18 or 19, wherein the part is a frame member of an aircraft.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A method of fabricating an intensifier, the method comprising:
    adding a mixture to a region of a mold, the mixture including a first amount of an elastomer and a constituent;
    curing the mixture to form an insert having a shape corresponding to the region of the mold;
    removing the insert from the mold;
    beveling an edge of the insert;
    inserting the insert back into the mold;
    adding a second amount of the elastomer to the mold and over the insert having the beveled edge; and
    curing the insert and the second amount of the elastomer to form the intensifier.

2. The method of claim 1, wherein the second amount of the elastomer forms a first portion of the intensifier and the insert forms a second portion of the intensifier, wherein the second portion is stiffer than the first portion.

3. The method of claim 2, wherein the second portion is located in a curved region of the intensifier.

4. The method of claim 1, wherein the elastomer is silicone and the constituent is tungsten powder.

5. The method of claim 1, wherein the elastomer includes at least one of silicone, flexible silicone rubber, tear resistant silicone rubber, liquid silicone molding rubber, or silicone that cures at room temperature.

6. The method of claim 1, wherein the constituent includes at least one of aluminum powder, steel powder/shot, tungsten powder, phenolic microspheres, or glass microspheres.

7. The method of claim 1, wherein the intensifier has a first flange, a second flange, and a web between the first and second flanges, and wherein the insert forms a portion of a bottom side of the web.

8. The method of claim 1, wherein the mold is a first mold, the method further including, after adding the second amount of the elastomer to the first mold, disposing a second mold on top of the first amount of the elastomer.

9. The method of claim 1, further including, after removing the intensifier from the mold, using the intensifier for fabricating a frame member for an aircraft.

10. A method of fabricating a part, the method comprising:
   adding part material to a mold;
   placing a contact barrier over the part material in the mold;
   placing an intensifier in the mold over the contact barrier and the part material, the intensifier including:
      a first portion including a first amount of an elastomer, wherein the first portion is cured to define an insert having a shape corresponding to a region of the mold, and wherein the insert includes a beveled edge, and
      a second portion including a mixture of a constituent and a second amount of the elastomer, the second portion stiffer than the first portion, the second amount of the elastomer formed over the insert; and
   curing the part material to form the part.

11. The method of claim 10, wherein the elastomer is silicone and the constituent is tungsten powder.

12. The method of claim 10, wherein the part is a frame member of an aircraft.

13. The method of claim 10, wherein the second amount of the elastomer is formed over the beveled edge of the insert.

* * * * *